United States Patent
Knox

(10) Patent No.: US 9,042,214 B2
(45) Date of Patent: *May 26, 2015

(54) ROUTER AND RAPID RESPONSE NETWORK

(71) Applicant: Edge Velocity Corporation, Salem, NH (US)

(72) Inventor: Frank J. Knox, Hudson, NH (US)

(73) Assignee: Edge Velocity Corporation, Salem, NH (US)

(*) Notice: Subject to any disclaimer, the term of this patent is extended or adjusted under 35 U.S.C. 154(b) by 3 days.

This patent is subject to a terminal disclaimer.

(21) Appl. No.: 14/273,905

(22) Filed: May 9, 2014

(65) Prior Publication Data

US 2014/0247708 A1 Sep. 4, 2014

Related U.S. Application Data

(63) Continuation of application No. 13/306,970, filed on Nov. 29, 2011, now Pat. No. 8,761,000.

(60) Provisional application No. 61/417,605, filed on Nov. 29, 2010.

(51) Int. Cl.
| | |
|---|---|
| G01R 31/08 | (2006.01) |
| H04W 36/00 | (2009.01) |
| H04W 28/08 | (2009.01) |
| H04W 24/04 | (2009.01) |
| H04W 48/00 | (2009.01) |
| H04W 88/16 | (2009.01) |
| H04W 36/22 | (2009.01) |

(52) U.S. Cl.
CPC .......... *H04W 36/0022* (2013.01); *H04W 28/08* (2013.01); *H04W 24/04* (2013.01); *H04W 48/17* (2013.01); *H04W 88/16* (2013.01); *H04W 36/22* (2013.01)

(58) Field of Classification Search
USPC .................. 370/328–339, 216–235; 455/436
See application file for complete search history.

(56) References Cited

U.S. PATENT DOCUMENTS

| | | | |
|---|---|---|---|
| 7,327,697 B1 | 2/2008 | Friday et al. |
| 7,593,356 B1 | 9/2009 | Friday et al. |
| 7,778,230 B2 | 8/2010 | Fulknier et al. |
| 7,813,314 B2 | 10/2010 | Fulknier et al. |

(Continued)

OTHER PUBLICATIONS

Office Action dated Jan. 31, 2014, U.S. Appl. No. 13/306,970, 21 pages.

(Continued)

*Primary Examiner* — Iqbal Zaidi
(74) *Attorney, Agent, or Firm* — Daly, Crowley, Mofford & Durkee, LLP

(57) ABSTRACT

A router includes a plurality of wireless network carrier cards, each of the network carrier cards adapted for use with one of a like plurality of different carrier networks, means for determining which of the plurality of network carrier cards provides a suitable connection to a carrier network and means for selecting one or more suitable connections to one or more carrier networks and for connecting the EVDO router to the carrier network through a particular one of the plurality of network carrier cards and a load balancing processor for load balancing between a plurality of different backbone networks and wherein the load balancing processor directs traffic among multiple networks to provide a desired throughput. In one embodiment, the router is provided as an evolution-data optimized (EVDO) wireless router.

17 Claims, 8 Drawing Sheets

(56) References Cited

U.S. PATENT DOCUMENTS

| | | |
|---|---|---|
| 7,813,721 B2 | 10/2010 | Kim |
| 7,813,736 B2 | 10/2010 | Small et al. |
| 2007/0174426 A1* | 7/2007 | Swildens et al. ............ 709/217 |
| 2007/0268865 A1 | 11/2007 | Garcia et al. |
| 2008/0106476 A1 | 5/2008 | Tran et al. |
| 2009/0265543 A1 | 10/2009 | Khetawat et al. |
| 2009/0316661 A1* | 12/2009 | Tachikawa et al. ........... 370/332 |
| 2010/0173632 A1* | 7/2010 | Kitaji ........................... 455/436 |
| 2010/0267383 A1 | 10/2010 | Konstantinou et al. |
| 2012/0134257 A1 | 5/2012 | Knox |

OTHER PUBLICATIONS

Office Action Restriction Requirement dated Nov. 7, 2013, U.S. Appl. No. 13/306,970, 4 pages.

Notice of Allowance and Issue Fee Due, dated May 6, 2014, U.S. Appl. No. 13/306,970, 16 pages.

U.S. Appl. No. 13/306,970.

* cited by examiner

ROUTER AND RAPID RESPONSE NETWORK

CROSS REFERENCE TO RELATED APPLICATIONS

This application is a Continuation application of and claims the benefit of and priority to U.S. patent application Ser. No. 13/306,970, filed on Nov. 29, 2011, which application claims the benefit of U.S. Provisional Application No. 61/417,605 filed Nov. 29, 2010 under 35 U.S.C. §119(e), which applications are incorporated by reference herein in their entirety.

GOVERNMENT RIGHTS

Not applicable.

FIELD

The system and techniques described herein relate generally to networks and more particularly to wireless network routers configured to operate with one or more cellular networks and to bridge wireless connectivity gaps by enabling immediate and continuous communication through a secure Wi-Fi (802.11 b/g/n) network and to provide a gateway access point to the Internet by connection to 3G and/or 4G cellular networks.

BACKGROUND

As is known in the art, mobile computer and other mobile electronic device users are increasingly relying on continuous access to Wide Area Networks, (WAN's), such as the world wide web, (www), Internet, Intranets, etc. to access data and software tools and to remain in continuous communication with others, e.g. by email, instant message, telephone, etc. Recently, wireless communication systems utilizing designated radio frequency bands have avowed mobile devices to interconnect with a WAN whenever the mobile device is within the usable range of a compatible wireless network.

As is also known, in emergency situations, conventional wireless local area network (WLAN) connections are often lost or unreliable. In this case, devices cannot communicate with a WAN or WLAN to access network services. Thus, first responders and other users often cannot receive or communicate information critical to success of a particular mission.

This problem has been addressed by cellular network providers by providing cell phones and PDAs with access to a WAN over a cellular network and by equipping cell phones and PDA's with basic email and web content display and editing functionality. However cell phones and PDA's are not equipped to perform even routine computer tasks and most portable computers are not equipped with cellular network interfacing gear. Accordingly, there is still a need to provide WAN access to mobile users wishing to perform computer or higher processing tasks in places where network access is not available or reliable, e.g. when traveling in a vehicle (bus or train), or boat or aircraft.

It would, therefore, be desirable to provide to a system which provides continuous communications through a plurality of wireless carriers.

SUMMARY

The systems and methods described herein support connectivity of processing units (e.g. clients) through one or more virtual private networks (VPN's) as well as through an internet and supports services (e.g. system status) and characteristics detected by one or more sensors (e.g. a heart rate monitor) coupled to the VPN via a processing unit.

The systems and methods described herein can also dynamically create peer VPN systems through cellular networks (i.e. processing unit to processing unit).

An evolution-data optimized (EVDO) wireless router includes a plurality of wireless network carrier cards, each of the network carrier cards adapted for use with one of a like plurality of different carrier networks, means for determining which of the plurality of network carrier cards provides a suitable connection to a carrier network and means for selecting one or more suitable connections to one or more carrier networks and for connecting the EVDO router to the carrier network through a particular one of the plurality of network carrier cards. The EVDO router further includes a load balancing system which directs traffic among multiple networks to provide a desired throughput. Stated differently, the router includes a load balancing module which utilizes multiple different carriers for load balancing.

With this particular arrangement, an EVDO wireless router acts as a gateway and allows simultaneous connections to a plurality of different wireless wide area network (WWAN) backbones. In one embodiment, the EVDO router performs load balancing between the plurality of different WWAN backbones.

Furthermore, since the EVDO gateway wireless router includes a plurality of different wireless network carrier cards, the EVDO gateway wireless router provides continuous communications through one or more or the plurality of wireless carriers.

In one embodiment, the system is configured to operate in a failover mode in which the system detects when one or more of a plurality of different networks is, for any reason, inoperable and routes all traffic only over one or more operating networks of the plurality of different networks. Thus, in the event that the system is coupled to two networks and only one of the networks is working, the system directs all data, communications and other information through the working network.

In one embodiment, the EVDO router includes one or more indicators (e.g. light omitting diodes or other visual indicator) which identify to a user which of a plurality of carrier networks are available and/or in use (e.g. WAN1 or WAN 2).

In one embodiment, the EVDO gateway wireless router comprises multiple PCI cards which allow the system to function as a multi-function router which supports Wi-Fi and cellular networks. In one embodiment, the EVDO gateway wireless router creates a mesh network and/or provides multiple access points to a network.

In one embodiment, the EVDO gateway wireless router further includes a network controller with each of the plurality of network carrier cards in communication with the network controller and each configured to become a client of a cellular network and to exchange network signals of a cellular network signal configuration between the cellular network and the network controller.

The EVDO router further comprises a network interface device in communication with the network controller configured as a local area network access point for hosting local area network configured client devices and for exchanging network signals of local area network signal configuration between the local area network client devices and the network controller.

In one embodiment, the EVDO gateway wireless router is functional to reconfigure a cellular network signal configuration to a local area network (LAN) signal configuration and vice-versa.

In one embodiment, the EVDO gateway wireless router is provided having a size and shape which makes the router suitable for inclusion in a vehicle or to be carried into a building.

In one embodiment, the EVDO gateway wireless router includes a PC board or mother board configured as a network controller. The EVDO gateway wireless router includes first and second wireless network interface devices. The first wireless network interface device may be configured as a cellular network interface device for exchanging network signals with a cellular network such as an EVDO configured cellular network. In this way, the EVDO the router may access a one or more WANs through a cellular network.

The second wireless network interface device may be configured to exchange second wireless network signals with a second wireless network, such as a wireless local area network (WLAN) configured as a Wi-Fi or other WLAN network. The network controller is also configured as a router for hosting a plurality of WLAN configured client devices and for directing network traffic between the client devices and a cellular network to access a WAN.

In particular, the router is configured to exchange signals between wireless networks of different configurations by exchanging wireless network signals with the first wireless network and the network controller using the first wireless network interface device and between the second wireless network and the network controller using the second wireless network interface device. The router controller then converts the first wireless network signals to the configuration of second wireless network signals and converts the second wireless network signals to the configuration of first wireless network signals. Network traffic can then be directed between the first and second wireless networks.

With this particular arrangement, an EVDO gateway wireless router enables users to bridge wireless connectivity gaps by enabling immediate communication through a secure Wi-Fi (802.11 b/g/n) network and provide a gateway access point to the internet via cellular networks (e.g. 3G and/or 4G cellular networks). The inter-link between the EVDO device and the cellular networks (3G or 4G) can be interconnected and shared virtually anywhere with the created network. The EVDO wireless system described herein fills the connectivity divides which separates various wireless systems, limit signal strength and service reach, coordinated response and resolution. The EVDO device described herein provides secure connectivity needed to support uninterrupted situational command and control capabilities and sustained interconnectivity across the divides of disparate networks.

The EVDO device facilitates seamless delivery of dependable communications for Government employees or corporate users within a wireless network and provides colleagues with the ability to remotely access secure private networks. Users achieve new levels of broadband communications and significantly extend and maximize the reach, scales and value of existing network assets.

Furthermore, in emergency response situations, the EVDO device described herein reaches beyond multi-channel capacity to help secure, protect and prioritize the throughput of mission critical data for first responders and other Government agencies. The EVDO device described herein includes proprietary software code which offers Government entities an intelligent means for sustained interconnected communications support. The distinct advantages of the EVDO system provide tremendous relief during a response to a natural disaster or acts of terrorism. First responders can quickly establish situational command and control communications outputs and share information vital to their mission with other responders and operations centers via the internet.

The installment of an EVDO router on a bus, train, boat or other moving vehicle presents passengers with new levels of real-time, converged IP voice, video and data services. Even high-speed motor vehicles can immediately establish multi-service networks on the fly and stay connected to fixed devices (e.g. RF towers) as well as to other mobile vehicles (e.g. safety vehicles such as police and fire vehicles) and with the use of vehicle mounted routers (VMRs) and intelligent base station (IBS) units which create a wireless mesh on the fly with other IBS/VMR devices. The IBS/VMR devices also perform access point (AP) services for other processing devices (e.g. portable processing elements such as laptops, tablets and other peripherals. This is enabled by hand-off technologies included in the EVDO device which ensure low, predictable delay and fill communication gaps, providing the connectivity for concurrent N-way, real time video conferencing data sharing and application access among mobile vehicles and individuals over large geographic areas.

In one embodiment, the EVDO gateway wireless router operates as a dual band gateway and thus is configured to operate with dual band carriers with a first carrier corresponding to a 1000 MHz North American PCS band and a second carrier corresponding to 2496-2690 MHz BRS/EBS band in USA and UMTS extension.

In one embodiment, the EVDO router operates in a time division duplex (TDD) 2.5 GHz mode.

In one embodiment the EVDO router operates with dual band receiver diversity (e.g. 1900 MHz and 2.5 Hz).

In one embodiment, the EVDO router utilizes an IP mobility routing technique described in U.S. Pat. No. 7,869,407 filed on Nov. 15, 2006 and assigned to the assignee of the present invention and incorporated herein by reference in its entirety.

In one embodiment, the EVDO router includes a plurality of WWAN, WWAN1 and WWAN2 interfaces, a LAN 4-port switch, IP Router-10/100 (RJ 45) WAN 1-port 10/100 (RJ 45) and a USB interface.

In one embodiment, the EVDO router includes a plurality of indicators (e.g. status LEDs) to indicate status of the WWAN connectivity, the 4-port LAN Switch, and the WAN as well as power being delivered to the router.

The EVDO router described herein finds use in a variety of different applications.

For example, first responders to fire, natural disaster, terrorism, plane crashes face a growing range of ever more complex incidents. The EVDO router described herein allows first responder organizations to respond rapidly to events knowing that their field networks will form quickly and be able to reliably transmit essential voice, video and data communications.

In transportation applications (e.g. commuter trains, urban subways and other densely crowded transportation environments), the EVDO router described herein allows early and accurate communications about location and situation to take place. Such early and accurate communications can make a large difference between a manageable event and an out-of-control crisis.

The EVDO router described herein enables flexible, adaptable, saturation-averse and far-reaching solutions for stand-alone, mobile and ad hoc networks. From underground to over water, the EVDO router described herein cooperates with wireless mesh networks to offer reliable, high-bandwidth communications that support essential services such as real-time voice and video communications as well as real-time position location tracking.

In applications like border security and homeland security, the U.S. Government operates networks with a critical need for saturation-averse reliability, self-healing resiliency, high bandwidth and 'go anywhere' reach and network extensibility. The EVDO router described herein allows organizations to deploy networks that operate reliably in the most challenging environments while providing real-time video, voice and data communications required for successful operations.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Figure 1:
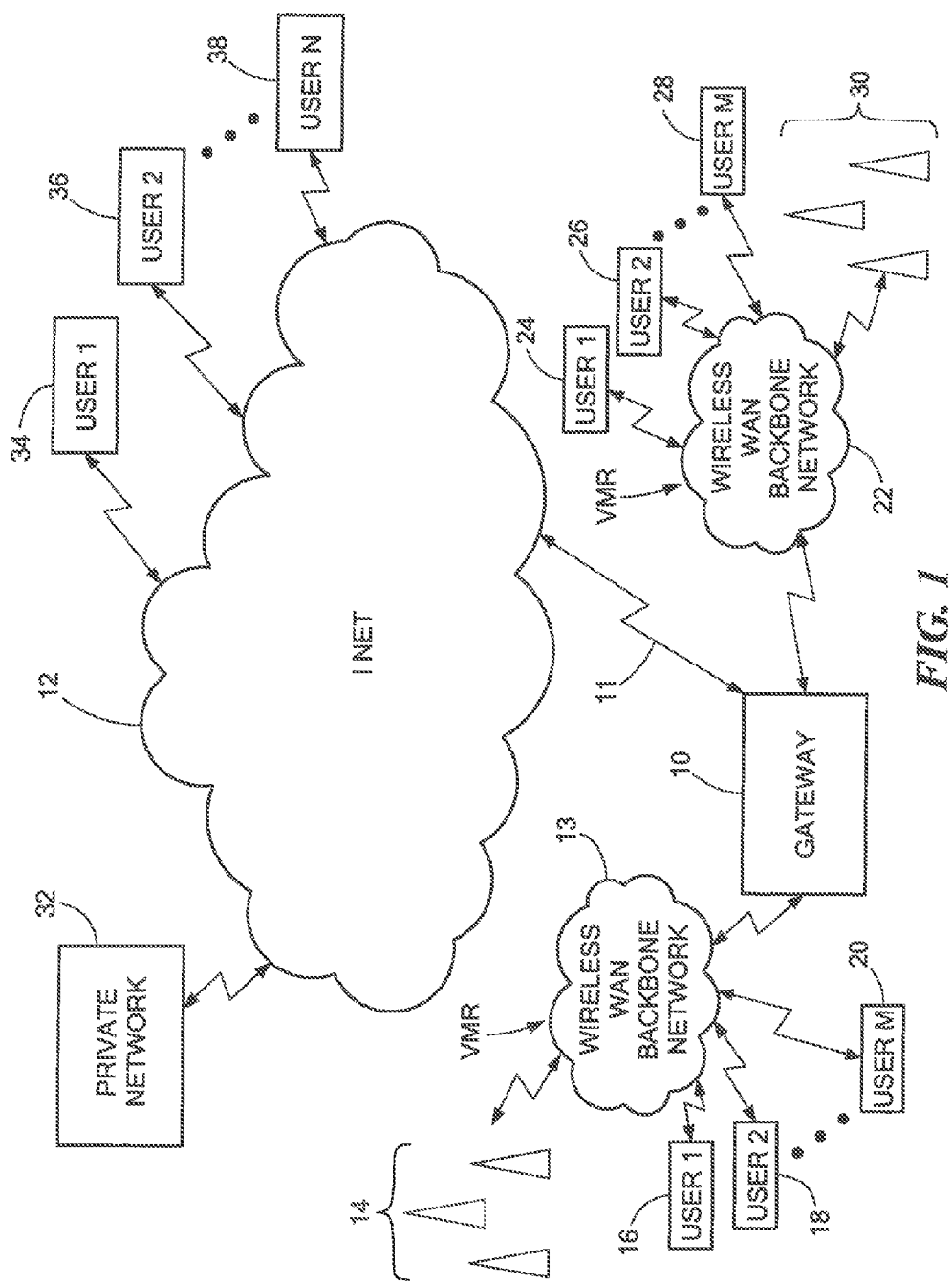
FIGS. 1-5 are block diagrams of exemplary network environments including an EVDO gateway wireless router.

Referring now to FIG. 1, an exemplary network includes a gateway 10 provided as an evolution-data optimized (EVDO) wireless router 10. Gateway 10 provides access to an internet 12 (e.g. such as the world wide web) over a wireless path 11 and also provides access to a plurality of wireless wide area networks (WAN) backbone networks with only two such backbone networks 13, 22 being here shown for clarity.

Backbone networks 13, 22, in turn, are in communication with respective ones of a plurality of radio towers 14, 30 as well as users 16-20 and 24-18. Other networks such as private network 32 and other users such as users 34-38 may be directly or indirectly coupled to internet 12.

As will be described below in more detail, WWANs 13, 22 to which users 16-20 and 24-28 are coupled may be provided as vehicle mounted routers (VMRs). Users 16-20, 24-28 may correspond to individual users or may represent other wide area networks which themselves may include plurality of network devices including but not limited to servers, digital data storage devices, telephone switching gear and network traffic controllers, all interconnected by a wire and sometimes wireless infrastructure and other global telecommunications infrastructures. WAN networks may act as a host to many network clients with each network client having a unique network identifier (e.g., an internet protocol (IP) address or a universal resource locator (URL)).

The EVDO wireless router 10 includes a plurality of wireless network carrier cards, each of the network carrier cards adapted for use with one of a like plurality of different carrier networks (e.g. networks 13, 22). EVDO wireless router 10 determines which of the plurality of network carrier cards provides a suitable connection to a carrier network and then selects one or more suitable connections to one or more carrier networks such that a communication path is provided between the EVDO router and the carrier network through a particular one of the plurality of network carrier cards.

In this manner, the EVDO wireless router acts as a gateway and allows simultaneous connections to a plurality of different wireless wide area network (WWAN) backbones. Furthermore EVDO router 10 comprises a load balancing processor which performs load balancing between the plurality of different WWAN backbones and directs traffic among multiple networks to provide a desired throughput.

Since the EVDO router includes 10 a plurality of different wireless network carrier cards, the EVDO gateway wireless router can provide continuous communications through one or more or the plurality of wireless carriers. Examples of different WWAN carriers include, but are not limited to, T-Mobile, Sprint-Nextel, Verizon and AT&T Wireless.

EVDO router 10 further comprises a failover module which causes the router to operate in a failover mode in which the router routes all traffic only over an operating network. Thus, in the event that the system is coupled to two WWAN networks, for example, and only one of the WWAN networks is working, the system directs all data, communications and other information through the working network.

Thus, the EVDO router described herein finds use in a variety of different applications. For example, first responders to fire, natural disaster, terrorism, plane crashes face a growing range of ever more complex incidents. The EVDO router described herein allows first responder organizations to respond rapidly to events knowing that their field networks will form quickly and be able to reliably transmit essential voice, video and data communications.

In transportation applications (e.g. commuter trains, urban subways and other densely crowded transportation environments). The EVDO router described herein allows early and accurate communications about location and situation to take place. Such early and accurate communications can make a large difference between a manageable event and an out-of-control crisis.

The EVDO router described herein enables flexible, adaptable, saturation-averse and far-reaching solutions for stand-alone, mobile and ad hoc networks. From underground to over water, the EVDO router described herein cooperates with wireless mesh networks to offer reliable, high-bandwidth communications that support essential services such as real-time voice and video communications as well as real-time position location tracking.

In applications like border security and homeland security, the U.S. Government operates networks with a critical need for saturation-averse reliability, self-healing resiliency, high bandwidth and 'go anywhere' reach and network extensibility. The EVDO router described herein allows organizations to deploy networks that operate reliably in the most challenging environments while providing real-time video, voice and data communications required for successful operations.

The EVDO gateway wireless router includes multiple PCI cards which allow the system to function as a multi-function router which supports Wi-Fi and cellular networks and which can also create a mesh network and/or provide multiple access points to a network.

The EVDO gateway wireless router includes a network controller with each of the plurality of network carrier cards in communication with the network controller and each configured to become a client of a cellular network and to exchange network signals of a cellular network signal configuration between the cellular network and the network controller. The router also includes a network interface device in communication with the network controller configured as a local area network access point for hosting local area network configured client devices and for exchanging network signals of local area network signal configuration between the local area network client devices and the network controller.

In one embodiment, the EVDO gateway wireless router is functional to reconfigure a cellular network signal configuration to a local area network (LAN) signal configuration and vice-versa.

The EVDO gateway wireless router includes first and second wireless network interface devices which may be configured as a cellular network interface device for exchanging network signals with a cellular network such as an EVDO configured cellular network. In this way, the EVDO the router may access a one or more WANs through a cellular network.

The second wireless network interface device may be configured to exchange second wireless network signals with a second wireless network, such as a wireless focal area network (WLAN) configured as a Wi-Fi or other WLAN network. The network controller also hosts a plurality of WLAN configured client devices and directs network traffic between the client devices and a cellular network to access a WAN.

Thus, the EVDO router is configured to exchange signals between wireless networks of different configurations by exchanging wireless network signals with the first wireless network and the network controller using the first wireless network interface device and between the second wireless network and the network controller using the second wireless network interface device. The router controller then converts the first wireless network signals to the configuration of second wireless network signals and converts the second wireless network signals to the configuration of first wireless network signals. Network traffic can then be directed between the first and second wireless networks.

In this manner the EVDO gateway wireless router 16 enables users to bridge wireless connectivity gaps by enabling immediate communication through a secure Wi-Fi (802.11 b/g/n) network and provide a gateway access point to the internet by connection via 3G and/or 4G cellular networks. The inter-link between the EVDO device and the cellular networks (3G or 4G) can be interconnected and shared virtually anywhere with the created network. The EVDO wireless system described herein fills the connectivity divides which separates various wireless systems, limit signal strength and service reach, coordinated response and resolution. The EVDO device described herein provides secure connectivity needed to support uninterrupted situational command and control capabilities and sustained interconnectivity across the divides of disparate networks.

The EVDO device facilitates seamless delivery of dependable communications for Government employees or corporate users within a wireless network and provides colleagues with the ability to remotely access secure private networks. Users achieve new levels of broadband communications and significantly extend and maximize the reach, scales and value of existing network assets.

Furthermore, in emergency response situations, the EVDO device described herein reaches beyond multi-channel capacity to help secure, protect and prioritize the throughput of mission critical data for first responders and other Government agencies. The EVDO device described herein includes proprietary software code which offers Government entities an intelligent means for sustained interconnected communications support. The distinct advantages of the EVDO system provide tremendous relief during a response to a natural disaster or acts of terrorism. First responders can quickly establish situational command and control communications outputs sand share information vital to their mission with other responders and operations centers via the internet.

The installment of an EVDO router on a bus, train, boat or other moving vehicle presents passengers with new levels of real-time, converged IP voice, video and data services. Even high-speed motor vehicles can immediately establish multi-service networks "on the fly" and stay connected to towers and other mobile vehicles with the use of VMRS and IBS units. This is enabled by hand-off technologies included in the EVDO device which ensure low, predictable delay and fill communication gaps, providing the connectivity for concurrent N-way, real time video conferencing data sharing and application access among mobile vehicles and individuals over large geographic areas.

In one embodiment, the EVDO gateway wireless router operates as a dual band gateway and thus is configured to operate with dual band carriers with a first carrier corresponding to a 1900 MHz North American PCS band and a second carrier corresponding to 2496-2690 MHz BRS/EBS band in USA and UMTS extension.

In one embodiment, the EVDO router operates in a time division duplex (TDD) 2.5 GHz mode.

In one embodiment the EVDO router operates with dual band receiver diversely (e.g. 1900 MHz and 2.5 Hz).

In one embodiment, the EVDO router utilizes an IP mobility routing technique described in U.S. Pat. No. 7,869,407 filed on Nov. 15, 2006 and assigned to the assignee of the present invention. In one embodiment, the EVDO router includes a plurality of WWAN, WWAN1 and WWAN2 interfaces.

Figure 2:
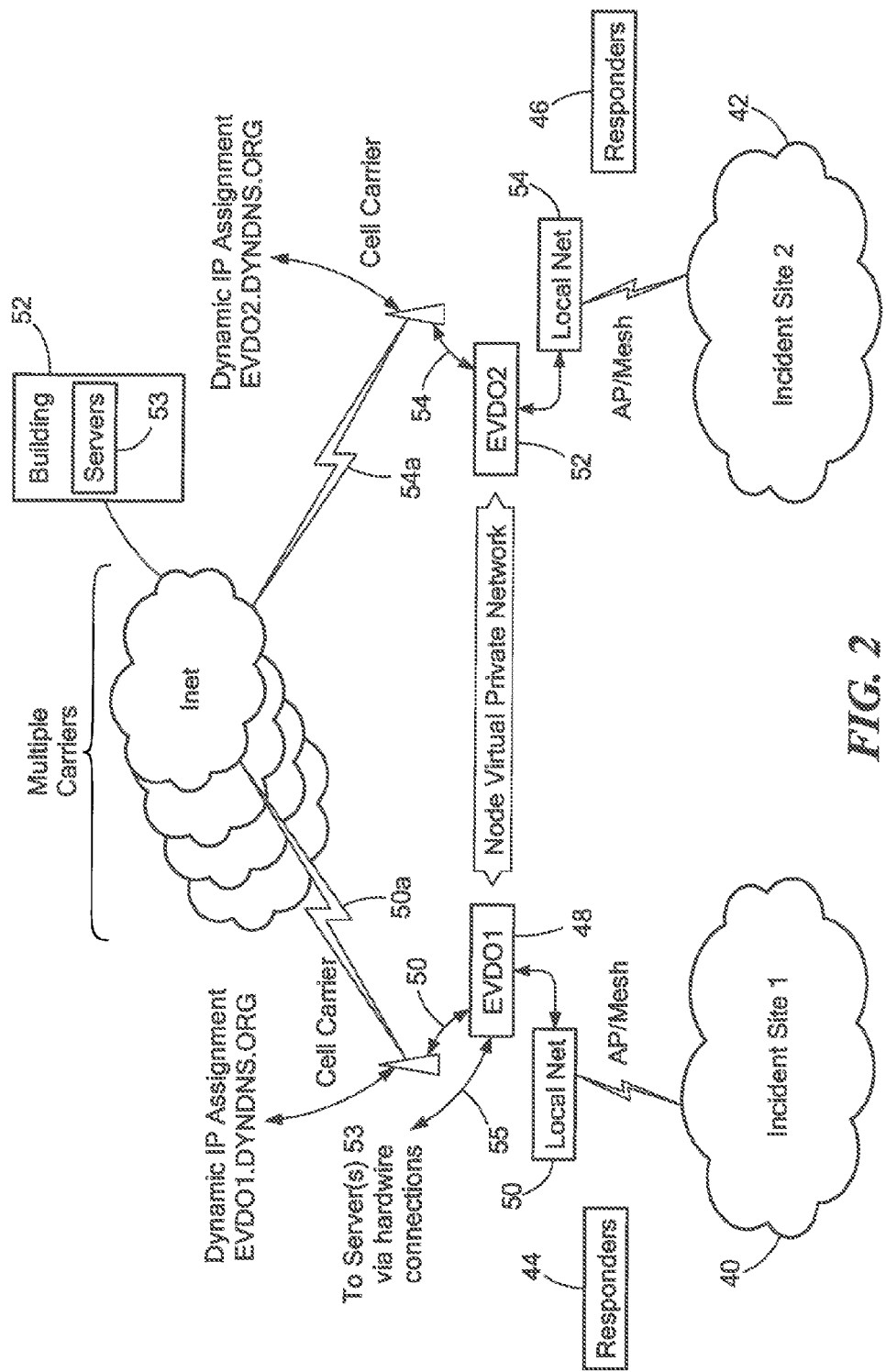

FIG. 2 illustrates a first responder scenario in which first responders are required at two different incident sites 40, 42. The nature of incident sites 40, 42 is such that a first set of first responders 44 responds to the first incident site 40 and a second set of responders 46 responds to the second incident site 42.

It is assumed for ease of explanation and illustration of the concepts described herein that responders 44 correspond to a first set of firemen and responders 44 correspond to a second different set of firemen. It is further assumed that a first fire chief is assigned to and on-site at first incident site 40 and that a second different fire chief is assigned and on-site at second incident site 42. It is also assumed for the purposes of this example, that a fire department operations center point 52 is remotely located from incident sites 40, 42 and that it is desirable to transmit and share all information from incident sites 40, 42 with operations center 52.

It should, of course, be appreciated that although in the exemplary embodiment of FIG. 2 responders 44, 46 correspond to firemen, responders 44, 46 can be any type of safety personnel including, but not limited to policemen, medical personnel or military personnel and that appropriate chief safety officials are assigned to each incident site 40, 42. It should also be appreciated that although in the exemplary embodiment of FIG. 2, only two incident sites are illustrated, the system and techniques described herein can accommodate more than two incident sites.

A first EVDO wireless router 48 operates at first incident site 40. EVDO router 48 establishes one or more network connections. For example EVDO router 48 establishes one or more cell carrier connections and internet connections to a command center 52 (e.g. a Fire Department Operations Center) located remotely from incident sites 40, 42. It should be appreciated that although only one cell carrier connection 50, 50a is illustrated in FIG. 2, EVDO router 48 supports connections with multiple carriers.

Vehicle mounted router (VMR) and intelligent base station (IBS) units 51 create a wireless mesh on the fly with other IBS/VMR units. The IBS/VMR units also perform access point (AP) services for other processing devices (e.g. portable processing elements such as laptops, tablets and other peripherals). This is enabled by hand-off technologies included in the EVDO router 48 which ensure low, predictable delay and fill communication gaps, providing the connectivity for concurrent N-way, real time video conferencing data sharing and application access among mobile vehicles and individuals over large geographic areas.

Similarly a second EVDO wireless router 52 operates at second incident site 42. EVDO router 52 also establishes one or more network connections. For example EVDO router 52 establishes one or more cell carrier connections and internet connections to the command center 52. It should again be appreciated that although only one cell carrier connection 54, 54a is illustrated in FIG. 2, EVDO router 52 supports connections with multiple carriers.

A vehicle mounted router (VMR) and intelligent base station (IBS) units 54 create a wireless mesh at incident site 42 on the fly with other IBS/VMR units. The IBS/VMR devices also perform access point (AP) services for other processing devices (e.g. portable processing elements such as laptops, tablets and other peripherals). This is enabled by hand-off technologies included in the EVDO router 52 which ensure low, predictable delay and fill communication gaps, providing the connectivity for concurrent N-way, real time video conferencing data sharing and application access among mobile vehicles and individuals over large geographic areas.

EVDO routers 48, 53 establish a virtual private network (VPN) 60 there-between, Thus, system connectivity is supported through VPN's as well as through conventional links.

To establish VPN nodes at both EVDO routers 48, 52, the DNS carrier I/F in each router is used and the VPN creates a tunnel between VPN node 48 and VPN node 52. Once the carrier comes online, an IP address is dynamically assigned (e.g. evdo1.dyndns.org and evdo2.dyndns.org) to each EVDO router (here only two routers 48, 52 are shown). The VPN is subsequently established between the two nodes (i.e. routers 48, 53). Thus, if two or more devices are deployed, then each device uses a dynamically assigned IP address to establish the VPN connection. The routers can thus dynamically create peer VPN systems (i.e. unit to unit) via a cellular (or other wireless) networks.

In this way, the routers support connectivity of processing units (e.g. clients) through one or more virtual private networks (VPN's) as well as through an Internet and supports services (e.g. system status) and characteristics detected by one or more sensors (e.g. a heart rate monitor) coupled to the VPN via a processing unit.

The DNS name resolution on carrier interfaces of both routers are used to create the VPN (aka a tunnel) between both nodes 48, 54. Each of the VPN devices or gateways is preferably replicated with identical configuration for the virtual services. In accordance with one embodiment, the VPN devices or gateways may be provided as SSL VPN devices. However, it can be appreciated that VPN devices or gateways can be based on any suitable VPN technology including IPsec (IP security)—commonly used over IPv4, and an obligatory part of IPv6, PPTP (Point-to-Point Tunneling Protocol), L2TP (Layer 2 Tunneling Protocol), L2TPv3 (Layer 2 Tunneling Protocol version 3), and VPN Quarantine.

By coupling EVDO routers 48, 52 through a VPN, information collected at incident site 40 may be shared with information collected at incident site 42. Thus, a fire chief (or other safety official) having a processing device (e.g. a laptop computer) directly coupled to EVDO router 48 is able to receive and share information with a fire chief having a processing device (e.g. a laptop computer) directly coupled to EVDO router 54 and vice-versa.

Although a wireless connections 50, 80a and 54, 54a are shown in FIG. 2, it should be appreciated that copper, fiber or other hardwire connections (indicated by reference numeral 55) may also be used, in whole or in part, in the communication path between EVDO devices 48, 52 and servers 53 disposed in command center 52.

Figure 3:
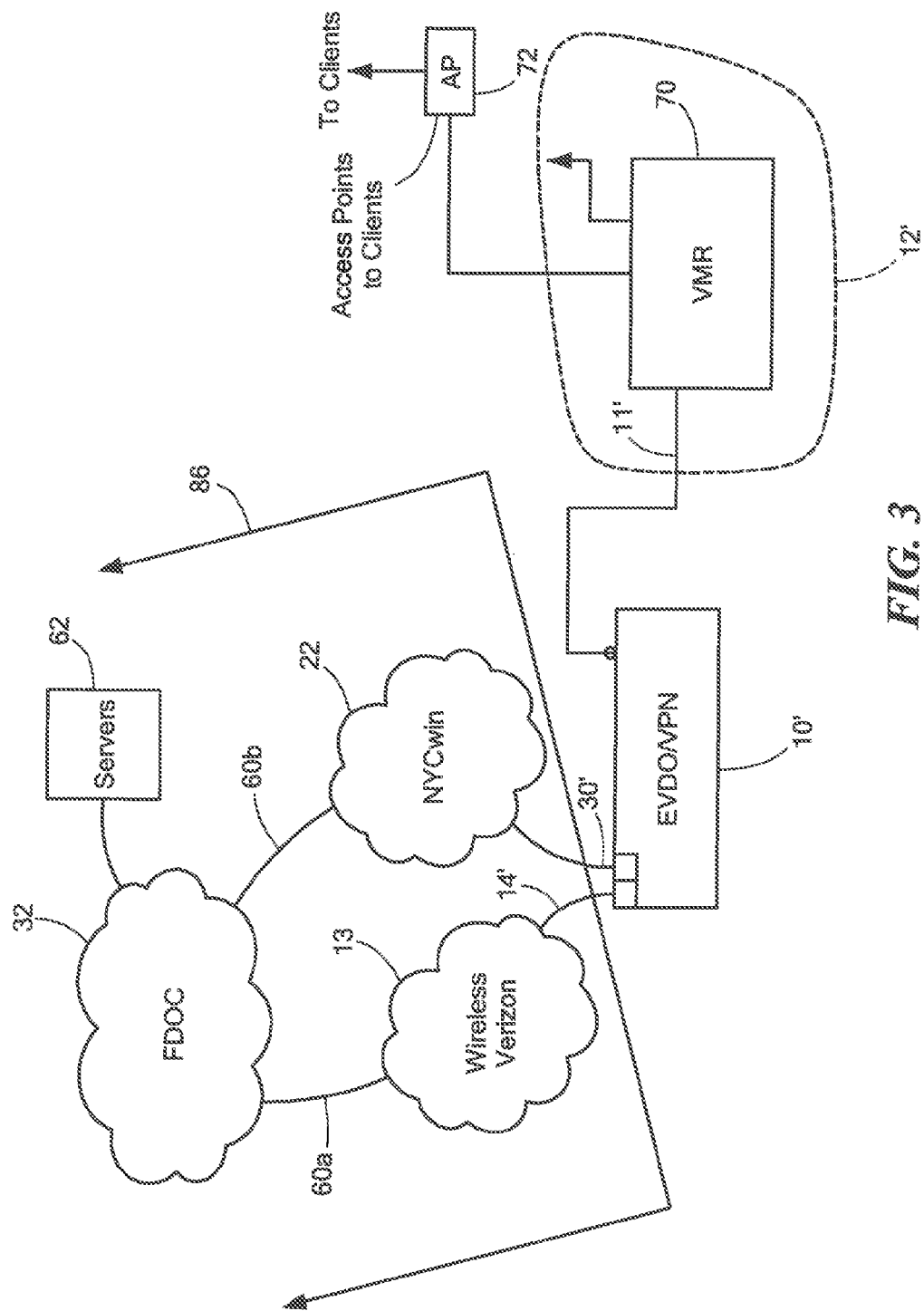

Referring now to FIG. 3, an EVDO gateway wireless router 10' establishes communications links 14', 30' with two different cell carriers 13', 22'. Router 10' may be the same as or similar to router 10 described above in conjunction with FIG. 1 and likewise, links 14', 30' and cell carriers 13', 22' may be the same as or similar to links 14, 30 and cell carriers 13, 22 described above in conjunction with FIG. 1. In the exemplary embodiment of FIG. 3, cell carriers 13', 22' are illustrated as Verizon Wireless and NYC Win carriers. Those of ordinary skill in the art will appreciate, of course, that cell carriers 13', 22' can correspond to any cell or wireless carrier and is not limited to Verizon or NYC Win carriers.

VPN connections 60a, 60b are established between a point of contact (POC) 32' and EVDO 10' through carrier connections 13', 22', POC 32' may be coupled to one or more servers 62. To establish the node VPN at EVDO router 10', the DNS carrier I/F is used and the VPN creates a tunnel between VPN node 10' and VPN node 62. Once the carrier comes online, an IP address is dynamically assigned. The VPN is subsequently established between the two nodes.

EVDO 10' is also coupled (e.g. via an Ethernet connection 11') to one or more VMRs (only one VMR 70 being shown in FIG. 3 for clarity) which establish a connection to an internet 12' which may be the same as or similar to internet 12 described above in conjunction with FIG. 1. Each VMR 70 provides an access point for any clients (e.g. users 16-20, 24-28, and 34-38 in FIG. 1).

Figure 4:
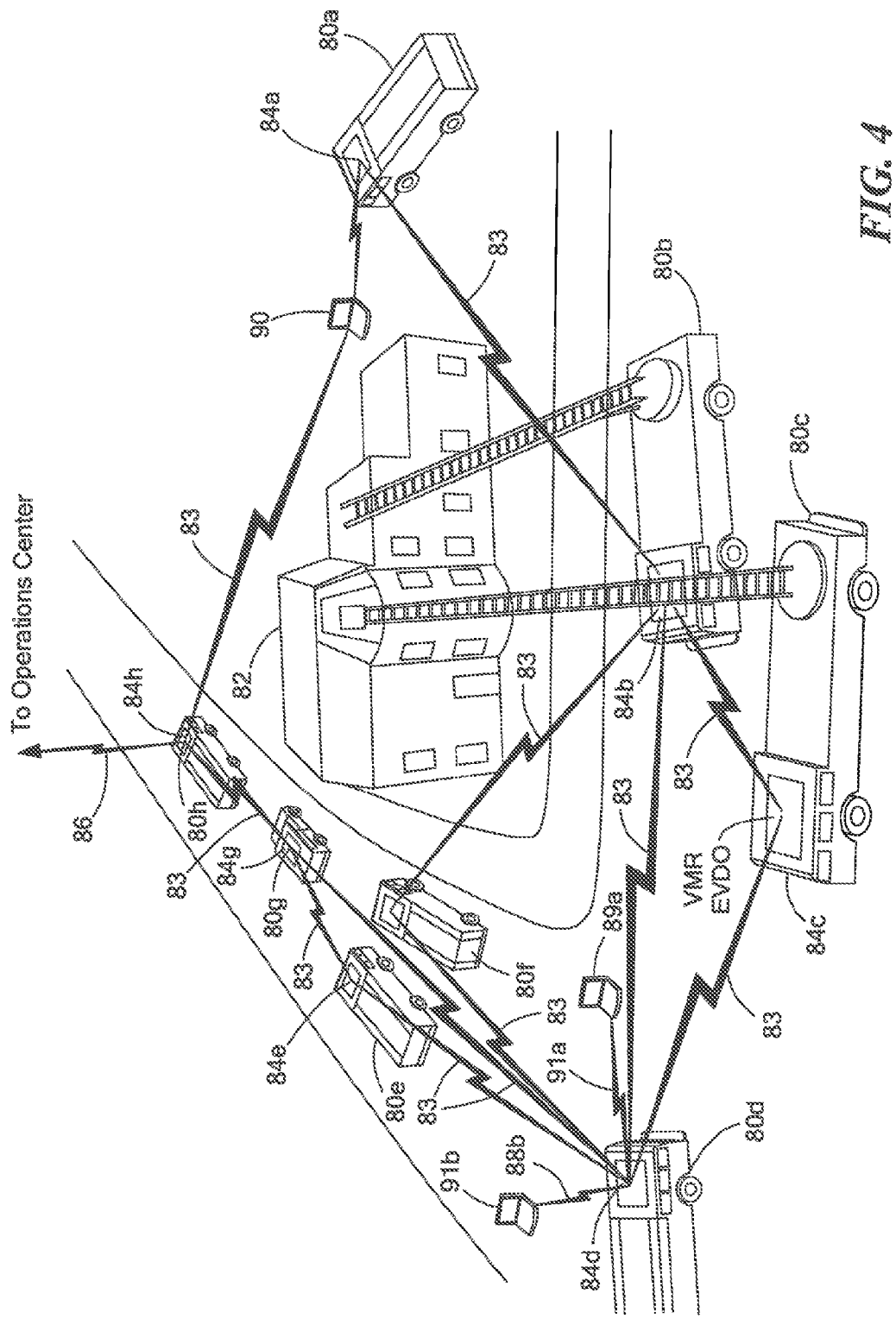

Referring now to FIG. 4, a plurality of emergency vehicles 80a-80h are deployed about a building 82 at which some incident (e.g. fire, etc. . . . ) has taken place. Each emergency vehicle 80a-80h has disposed thereon a vehicle mounted router (VMR) 84a-84h.

Each VMR 80a-80h operates to automatically and rapidly establish a wireless communications service that reaches high-angle aerial, underground, deep in-building and externally located responders and supporting entities. Thus, the network deploys immediately and easily to form a secure, self-healing mesh broadband network that supports real-time IP based voice, video and data services. In addition to rapid communications via links 83, the VMRs provides a high-speed communication system that establishes and maintains a multi-service network connection to fixed infrastructure towers (e.g. towers 14, 30 shown in FIG. 1), as well as ad hoc communications among stationary and moving vehicles (e.g. vehicles 80a-80h), without high bandwidth loss, VMRs 80a-80h support concurrent, two-way, real-time video conferencing, data sharing, and application access among mobile vehicles and individuals over large geographic areas.

The emergency response communications system of FIG. 4 utilizes a multi-mesh backbone wireless system provided by VMRs 80a-80h, and RDR 90. The mesh and mobile IP wireless solutions enable delivery of high-bandwidth data and real-time converged services among stationary and moving users, in challenging environments.

The mesh supports common-off-the-shelf and legacy components, applications, and hand-held devices to communicate in adverse environments. With the mesh, routers on the system can communicate without over saturating (or using more power), keeping within FCC regulations in licensed and unlicensed frequencies. The VMRs ensures that the communications link is stable and usable before transmitting data, and network management protects prioritized services in realtime. The mesh is self-forming and automatically reconfigures itself to support a downed device from either catastrophic failure or device(s) leaving the location.

Working together, the mounted and mobile routers are designed to support communications at the terrestrial and sub-terrestrial levels. The VMRs are layer-4 aware and therefore provide the necessary features for true mesh and mobile broadband IP solutions. Each VMR supports a plurality of different radio transceivers (e.g. in the range of four to eight radio transceivers). Each VMR 80a-80h also supports a multitude of frequency bands, licensed or unlicensed: unlicensed ranging from 180 MHz to 6 GHz.

The radios utilize the mini-PCI format for modularity and investment protection by allowing new technologies such as WiMAX and 802.11n MIMO radios to be added. The VMRs utilize orthogonal frequency division multiplexing (OFDM) modulation technology to easily deliver speeds upwards of 100+ Mb/s in direct line of sight applications, and supports near-line-of-sight (NLOS) wireless communication as well. A hand off layer acts as the bridge for all broadband wireless mobile devices to link into an IBS, which is a core router which supports roaming IP addresses, and eventually link into the Public Internet.

It should be noted that each VMR 84a-84h has the capability to transmit to the operations center, In this exemplary embodiment however, only VMR 80h performs the OC backhaul as indicated by reference numeral 86.

The system further includes one or more rapid deploy routers (RDRs) 90 only one of which is shown in FIG. 4. RDR 90 is communication with VMRs 80a, 80h. In the exemplary embodiment of FIG. 4, RDR 90 transmits video signals to VMRs 80a, 80h. In general RDR units establish a portable mesh node with access points and allow in-building coverage by extending the mesh insides structures (e.g. inside structure 82). RDR 90 also performs access point services for laptop computers and other portable processing devices (e.g. tablets) and peripherals. In one embodiment, AES encryption is utilized on all mesh links (e.g. links 83). In one embodiment, RDR units operate at frequencies of 900 MHz and 2.4 GHz.

It should also be appreciated that VMR 64d also acts as a local access point (AP) for mobile processing devices 91a, 91b.

Figure 5:
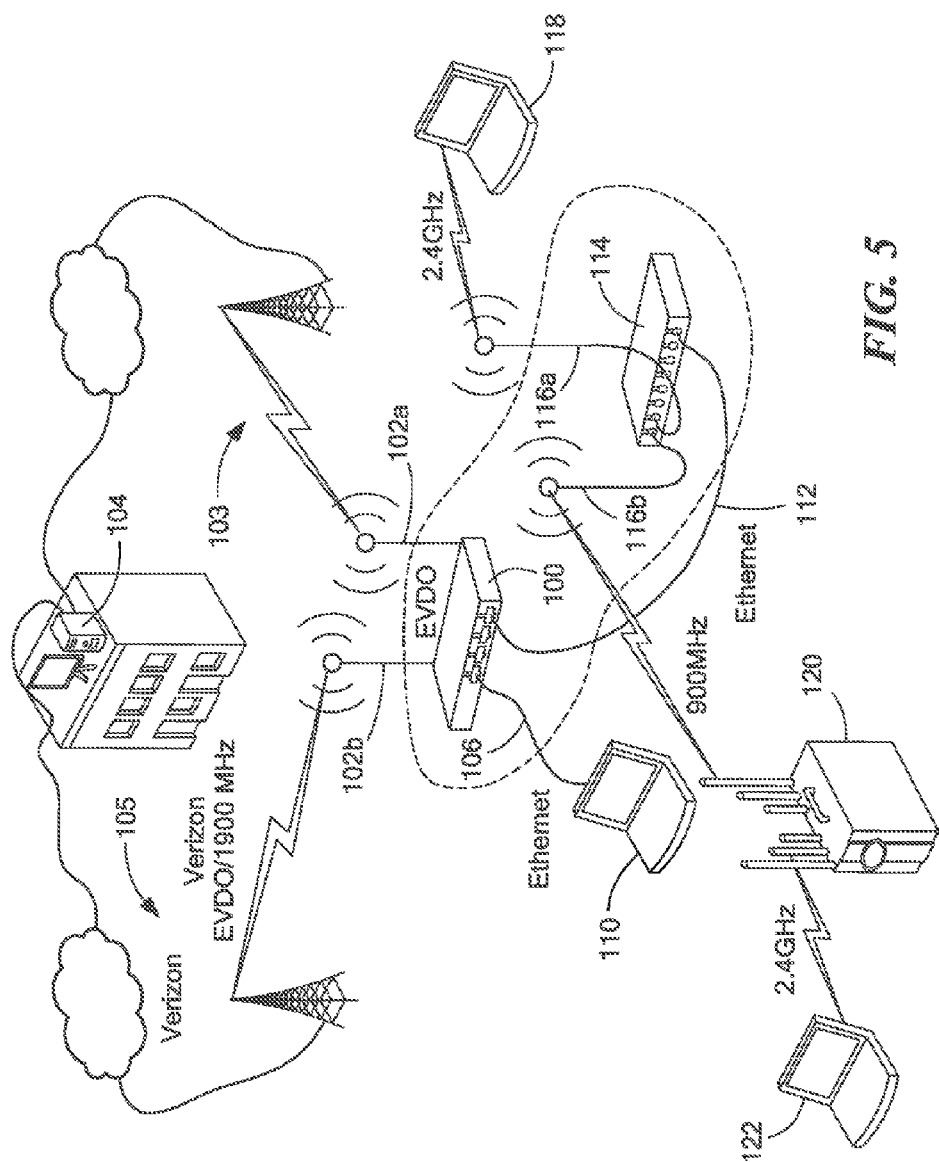

Referring now to FIG. 5, a system includes an EVDO router 100 which includes at least two RF transceivers (not visible in FIG. 5). The RF transceivers transmit and receive signals at two different frequencies via respective ones of antenna 102a, 102b. A first one of the transceivers is coupled to antenna 102a and EVDO router 100 forms a first communication path 103 to one or more servers 104 via a first wireless link 103 provided as an IP wireless cell carrier connection at a frequency of about 2500 Mhz. In one exemplary embodiment, such a connection may be made via the New York City Wireless Network (NYCWIN). Other emergency and non-emergency wireless services (e.g. other citywide wireless services) may, of course also be used. Via link 103, router 100 establishes a secure VPN connection (e.g. an IPSEC/SSL VPN tunnel) to the one or more servers 104.

Concurrently EVDO router 100 forms a second communication path 105 to servers 104 via antenna 102b. A second one of the transceivers is coupled to antenna 102b and EVDO router 100 forms a second communication path 106 to the one or more servers 104. The second communication path is established via a second cell carrier connection at a frequency of about 1900 MHz. In one embodiment, router 100 utilizes a Verizon wireless service and EVDO at 1900 MHz. Via link 105, router 100 establishes a second secure VPN connection (e.g. an IPSEC/SSL VPN tunnel) to the one or more servers 104.

Router 100 thus performs backhaul tasks to server 104 via wireless carrier services (e g. NYCWIN and Verizon services). Furthermore, Router 100 determines the best link possible to communicate with the server 104 based upon the performance of the links. Accordingly, all network traffic between the links (e.g. all traffic from NYCWIN to Verizon and vice-versa) is walled off to stop cross network contamination.

Router 100 also has a first Ethernet connection 106 to a mobile processing device 110 (e.g. a laptop computer) and a second Ethernet connection 112 coupled to an Intelligent Base Station/vehicle mounted router (IBS/VMR) VMR 114. Internal devices connected to the Ethernet ports are NAT translated.

IBS/VMR 114 includes at least two RF transceivers (not visible in FIG. 5). The RF transceivers transmit and receive signals at two different frequencies via respective ones of antenna 116a, 116b. Via a first VMR transceiver and antenna 116a, VMR establishes a wireless link to a first processing device 118 which may be provided, for example, as mobile processing device such as a laptop computer. In one embodiment the link is established at a frequency of 2.4 GHz. Via a second VMR transceiver and antenna 116b, VMR also concurrently establishes a wireless link to an RDR unit 120. In one embodiment the link is established at a frequency of 900 MHz.

IBS/VMR 114 forms a mesh and also provides access point services (e.g. for mobile processing device 118). It should be appreciated that IBS/VMR has the ability to create a mesh on the fly with other IBS/VMR devices. As noted above, IBS/VMR 114 also performs access point services for processing devices including, but not limited laptop computers and other peripherals. In one embodiment encryption (e.g. AES encryption) is used on all mesh links. It should be appreciated that although the exemplary embodiment described herein utilizes frequencies of 900 MHz and 2.4 GHz, other frequencies may also be used.

It should be appreciated that IBS/VMR 114 provides a core mesh cloud of a rapidly-deployable, saturation-averse, secure high band-width 802.11 network. In one embodiment, the IBS/VMR 114 includes a four radio frequency transceivers corresponding to 2.4 GHz MIMO and 5.2 GHz MiMO MESH radios.

EVDO router 100 and IBS/VMR 114 rapidly and automatically establish a wireless communications service. RDR unit 120 establishes a portable mesh node with access points to other processing devices such as mobile processing device 122. RDR unit 120 also allows in-building coverage by extending the mesh insides structures (e.g. such as structure 82 in FIG. 4). In this way, the wireless communication service established by EVDO router 100 and IBS/VMR 114 is able to reach high-angle aerial, underground, deep in-building and externally located responders and supporting entities.

The network formed by router 100 and IBS/VMR 114 deploy immediately and form a secure, self-healing mesh broadband network that supports real-time IP based voice, video and data services. The system supports concurrent, two-way, real-time video conferencing, data sharing, and application access among mobile vehicles and individuals over large geographic areas. The devices are layer-4 aware and therefore provide the necessary features for true mesh and mobile broadband IP solutions.

Figure 6:
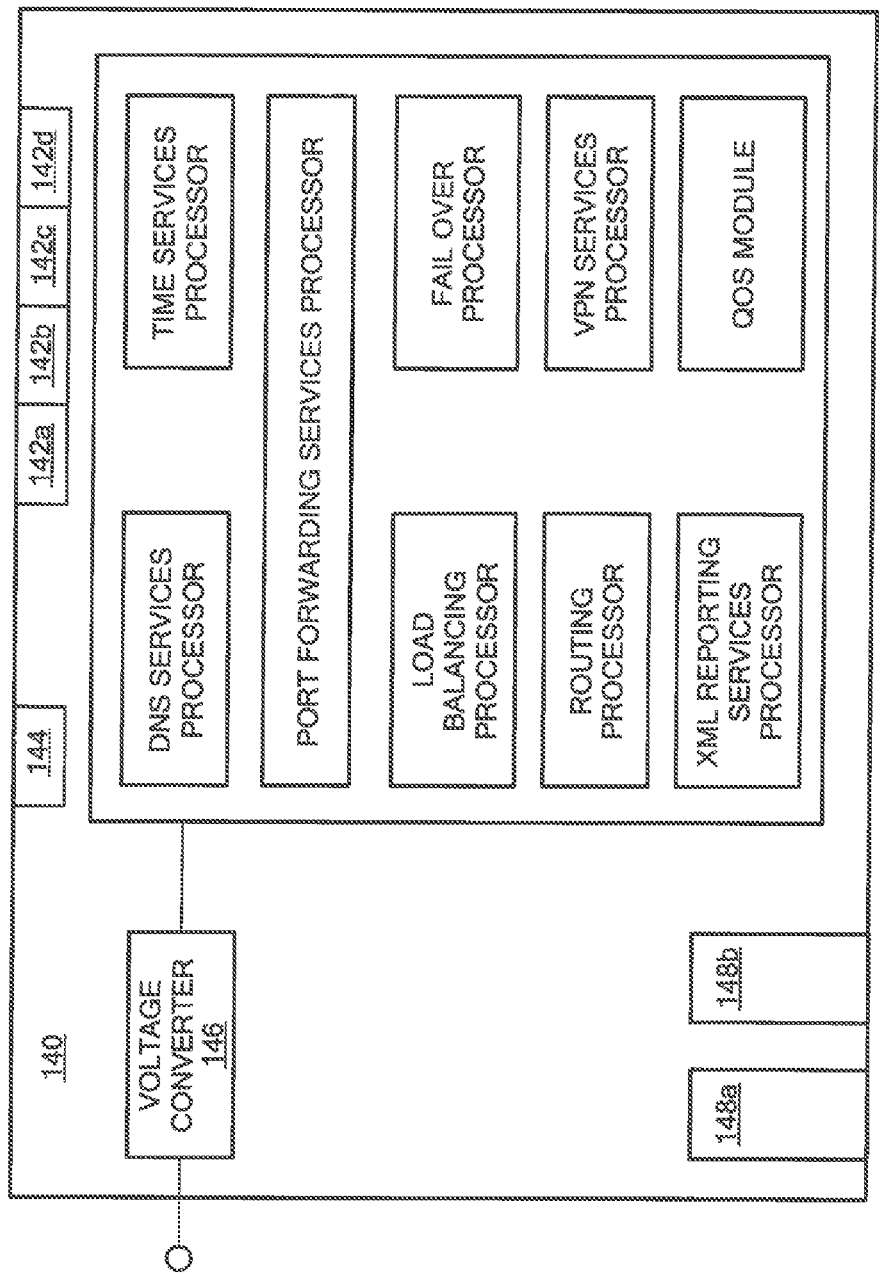
FIG. 6 is a block diagram of an EVDO gateway wireless router of the type which may be used in the network environment of FIG. 1.

Referring now to FIG. 6 an EVDO gateway wireless router 140 which may be the same as or similar to EVDO gateway wireless router 10 described above in conjunction with FIG. 1, includes a plurality of LAN ports 142a-142d leading to a true four port network switch, a plurality of USD ports 144, 148a, 148b each of which are coupled to mini-PCI-Ex connections. Ports 148a, 148b are used for example to coupled to wireless carrier systems (e.g. NYCWIN and Verizon wireless carrier systems). The USB ports can be used to connect peripherals (e.g. GPS devices). The system also includes a direct WAN for an Ethernet connection via an Ethernet interface module installed in the router which operates in accordance with IEEE standard 802.3 as is generally known.

In one embodiment, the EVDO Gateway Wireless Router operates as a dual band gateway and thus is configured to operate with dual band carriers with a first carrier corresponding to a 1900 MHz North American PCS band and a second carder corresponding to 2496-2690 MHz BRS/EBS band in USA and UMTS extension.

In one embodiment, the EVDO router operates in a time division duplex (TDD) 2.5 GHz mode.

In one embodiment the EVDO router operates with dual band receiver diversity (e.g. 1900 MHz and 2.5 GHz).

In one embodiment, the EVDO router utilizes an IP mobility routing technique described in U.S. patent application Ser. No. 11/600,007 assigned to the assignee of the present Invention and published on Sep. 27, 2007 as Pat. Publ. 2007-0225019 which application is hereby incorporated herein by reference in its entirety.

In one embodiment, the EVDO router includes a plurality of WWAN, WWAN1 and WWAN2 interfaces, a LAN 4-port switch, an IP Router-10/100 (RJ 45), a WAN 1-port 10/100 (RJ 45) and a USB interface.

In one embodiment, the EVDO includes a plurality of indicators (e.g. LEDs) to indicate status of one or all of WAN1, WAN2, WWAN, LAN switch, and power.

In one embodiment, EVDO router 140 comprises a motherboard which functions as a controller and a plurality of network carrier interface devices, 142a-142d, 144, and 148 interfaced with the controller and in communication therewith.

EVDO router 140 further includes a DNS services processor, a time processor, a port forwarding services processor, a routing processor, a VPN processor a firewall services processor and XML report service processor and a quality of service (QOS) module which performs a prioritization service based upon the status of specific ports and bandwidth requirements and use. Router 140 further comprises a load balancing system which directs traffic among multiple networks to provide a desired throughput. Stated differently, the router includes a load balancing processor or module which utilizes multiple different carriers for load balancing.

EVDO router 140 further includes a pair of transceivers which allow router 140 to provide access point services for devices.

Figure 7:
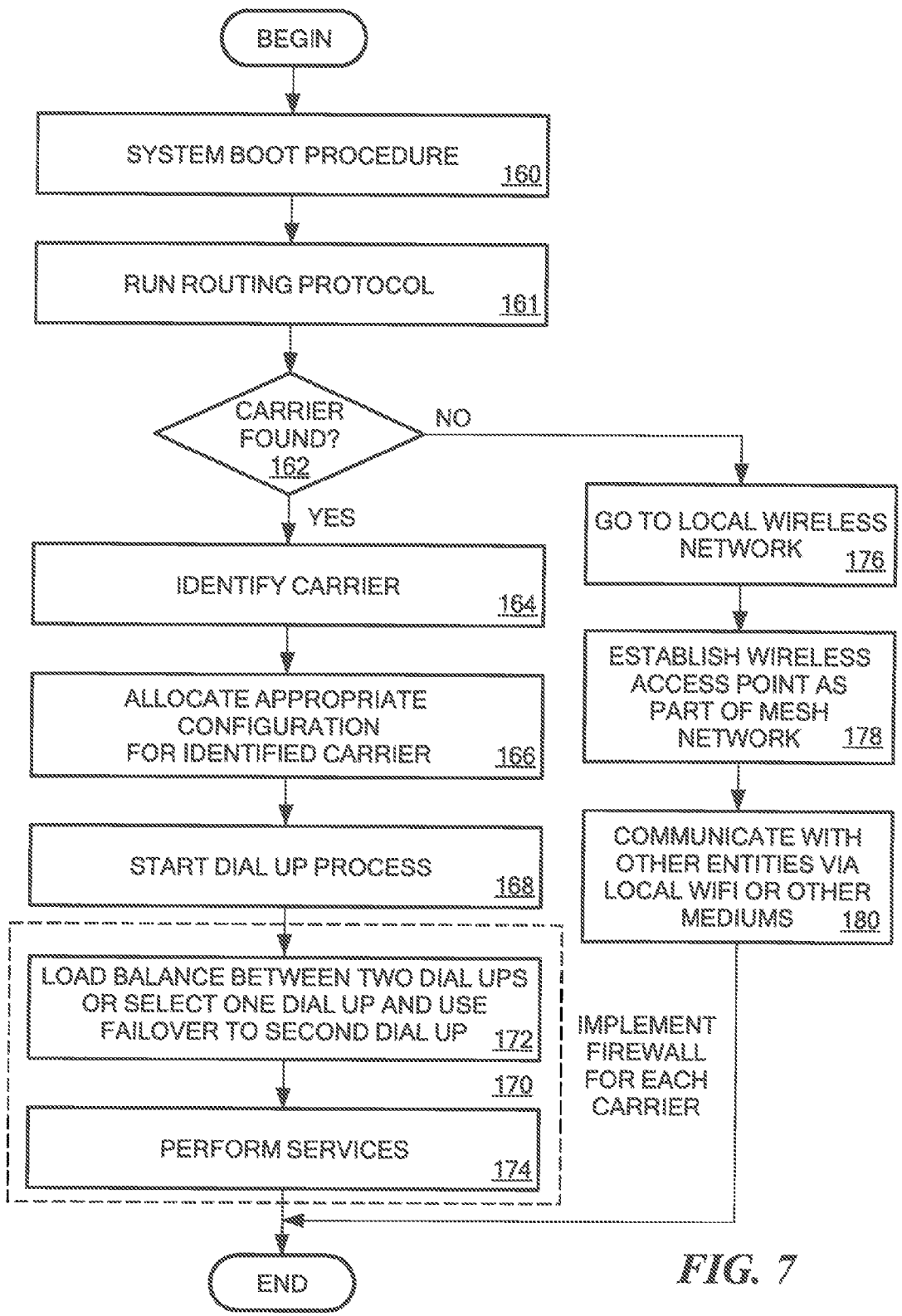
FIG. 7 is a flow diagram of the processing performed by an EVDO gateway wireless router.
Figure 8:
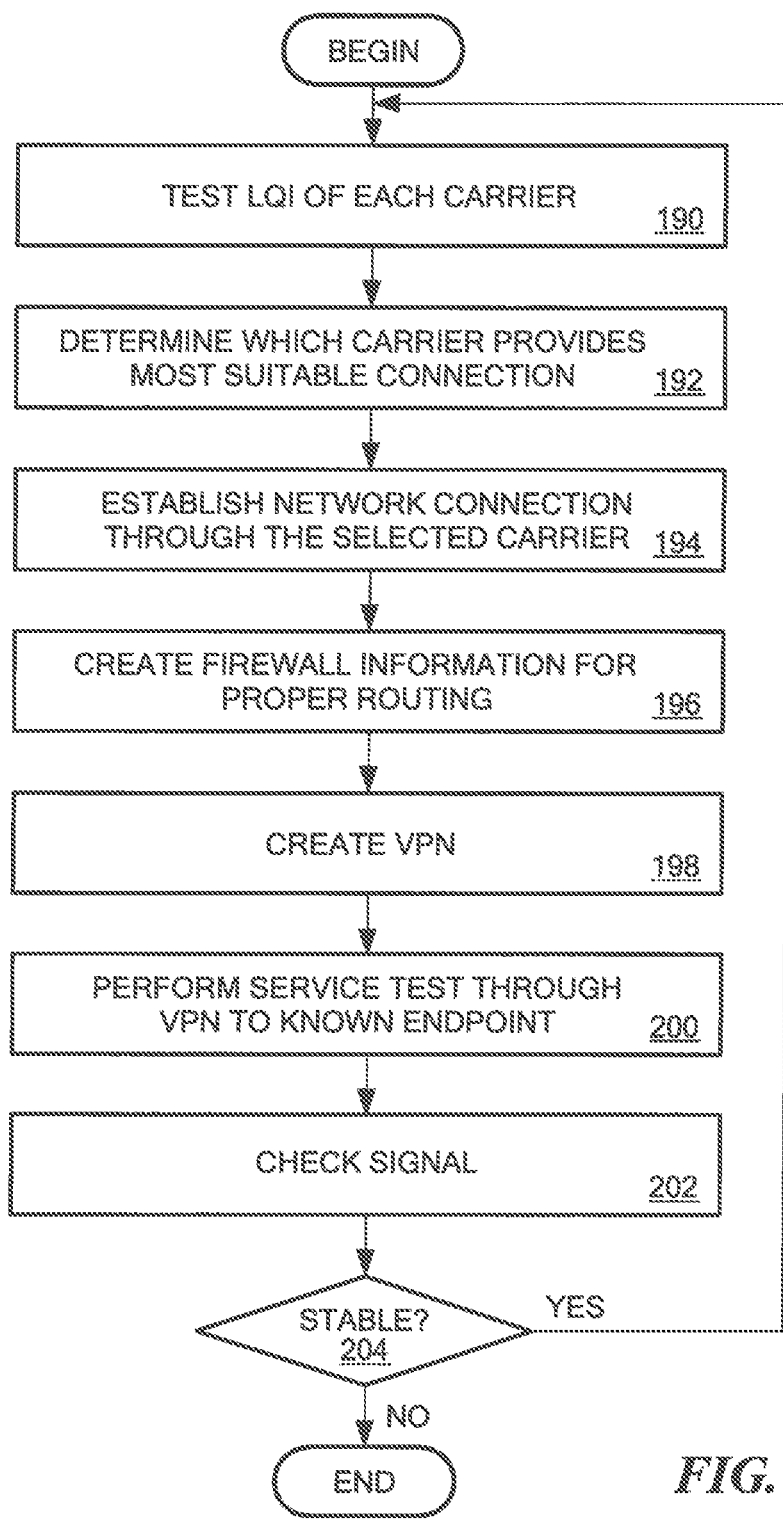
FIG. 8 is a flow diagram of a test services process performed by an EVDO gateway wireless router.

FIGS. 7 and 8 are flow diagrams showing the processing performed by or on behalf of a router node which may, for example, be provided as part of a network such as one of the networks shown in FIGS. 1-5. In particular, the flow diagrams illustrate methods of establishing a communication link in a network.

The rectangular elements (e.g. block 160 in FIG. 7) in the flow diagrams are herein denoted "processing blocks" and represent steps or instructions or groups of instructions. Some of the processing blocks can represent an empirical procedure or a database while others can represent computer software instructions or groups of instructions. Some of the steps described in the flow diagram may be implemented via computer software while others may be implemented in a different manner e.g. via an empirical procedure.

The diamond shaped elements (e.g. block 162 in FIG. 7) in the flow diagrams are herein denoted "decision blocks" and represent steps or instructions or groups of instructions which affect the execution of the computer software instructions represented by the processing blocks. Some of the processing blocks and/or decision Hocks can represent an empirical procedure or a database while others can represent computer software instructions or groups of instructions. Some of the processes described in the flow diagram may be implemented via computer software while others may be implemented in a different manner e.g. via an empirical procedure.

Alternatively, some of the processing blocks and/or decision blocks can represent processes performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to perform the processes or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the concepts, systems and techniques described herein.

Turning now to FIG. 7, in one embodiment, processing of an EVDO gateway wireless router begins in processing block 160 with a system boot procedure.

Processing then proceeds to processing block 161 in which a routing protocol is executed to determine whether to establish a connection over a carrier or via a local wireless network. Processing then flows to decision block 162 in which a decision is made as to whether a suitable carrier is available. If a suitable carrier is found, then processing proceeds to processing block 164 in which the carrier is identified and processing block 166 in which an appropriate configuration is allocated for the identified carrier.

In processing block 168, a dial up process begins and then a firewall is implemented for each carrier as indicated by processing block 170. The firewall implementation process includes processing blocks 172, 174. In processing block 172 either a load balance is performed between the two dial ups or one dial up is selected and the second dial up is used as a failover and in processing block 174 services are performed. Services may include, for example, VPN services and test services (FIG. 8).

Referring now to FIG. 8, a test service process performed by a router such as one of the routers described above in conjunction with FIGS. 1-6 begins in processing block 190 where the router tests a link quality index (LQI) of each carrier.

Processing then proceeds to processing block 192 in which the router determines which carrier provides the most suitable connection based upon the obtained LQI values. Processing then proceeds to block 194 an actual network connection is established through the selected carrier.

In processing block 196, firewall information is created for proper routing and then a VPN is established as shown in processing block 198. The VPN is created by starting a protocol service in which a router advertises that the router is able to establish a connection.

Then, as shown in processing block 200, test services are performed through the VPN to a known endpoint (i.e. the know server). Next, as shown in blocks 202, 204, the signal is checked a determination is made as to whether the signal is stable. If the signal is stable, then the process restarts. It should be noted that the process runs periodically to prevent the network from being flooded due to a bad link.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A router comprising:
    a plurality of wireless network carrier cards, each of the wireless network carrier cards adapted for use with one of a like plurality of different carrier networks;
    a carrier card determination processor to determine which of the plurality of wireless network carrier cards provides a suitable connection to a carrier network;
    a carrier selection processor to select one or more suitable connections to one or more of the carrier networks in response to information from said carrier card determination processor;
    a carrier connection processor to connect the router to the carrier network through a particular one of the plurality of wireless network carrier cards;
    a load balancing processor for load balancing between a plurality of different backbone networks, wherein the load balancing processor directs traffic among multiple networks to provide a desired throughput;
    a failover module circuit which operates in a failover mode such that the router routes all data, communications and other information only over an operating network;
    a network controller in communication with the plurality of wireless network carrier cards wherein the plurality of wireless network carrier cards are configured to become a client of a cellular network and to exchange network signals of a cellular network signal configuration between the cellular network and the network controller; and
    a network interface device in communication with the network controller configured as a local area network access point for hosting local area network configured client devices and for exchanging network signals of local area network signal configuration between the local area network client devices and the network controller.

2. The router of claim 1, wherein the carrier connection processor comprises communication paths for connecting the router to the plurality of different backbones.

3. The router of claim 1, wherein the carrier connection processor comprises communication paths for contemporaneously connecting the router to the plurality of different backbones.

4. The router of claim 1, wherein the router provides continuous communications through one or more carrier networks.

5. The router of claim 1 further comprising one or more indicators which identify to a user which of a plurality of carrier networks are available and/or in use.

6. The router of claim 5 further comprising multiple expansion cards which allow the router to operate as a multi-function router which supports Wi-Fi and cellular networks.

7. The router of claim 6 wherein said expansion cards are PCI cards.

8. The router of claim 6 further comprising means for creating a mesh network and/or for providing multiple access points to a network.

9. The router of claim 1 wherein the router is provided having a size and shape such that the router is suitable for inclusion in a vehicle or to be carried into a building.

10. The router of claim 1 further comprising means for enabling communication through a secure network and for providing a gateway access point to an internet by connection via one or more cellular networks.

11. The router of claim 10 wherein said secure network is a secure Wi-Fi network.

12. The router of claim 10 wherein the one or more cellular networks are one or more 3G and/or 4G cellular networks.

13. A system for providing communications at an incident site, the system comprising:
    at least one evolution-data optimized (EVDO) wireless router, said EVDO wireless router comprising:
        a plurality of wireless network carrier cards, each of the network carrier cards adapted for use with one of a like plurality of different carrier networks;
        a carrier card determination processor to determine which of the plurality of network carrier cards provides a suitable connection to a carrier network;
        a carrier selection processor to select one or more suitable connections to one or more of the carrier networks in response to information from said carrier card determination processor; and
        a carrier connection processor to connect the EVDO muter to the carrier network through a particular one of the plurality of network carrier cards;
        a load balancing processor for load balancing between a plurality of different backbone networks and wherein the load balancing processor directs traffic among multiple networks to provide a desired throughput; and
        a failover system for detecting a network failure and in response to detection of a network failure for causing the router to operate in a failover mode such that the routes all data, communications and other information only over an operating network;
    at least one wireless Intelligent base station (IBS) which provides a core mesh cloud of rapidly-deployable, saturation-averse, secure high band-width networks, said IBS comprising:
    four radio frequency transmitter/receiver units;
    a 2.4 GHz MIMO;
    a 5.2 GHz MIMO; and
    a MESH radio;
    one or more vehicle mounted routers, each of said one or more vehicle mounted routers comprising:
        means for establishing a communications link and for ensuring that the communications link is stable and usable before transmitting data in accordance with one or more of IEEE 802.16, IEEE 802.11s, LTE, and Satellite standards; and
        means for creating a self-forming mesh and for automatically reconfiguring itself to support a downed device from either catastrophic failure or device(s) leaving the location in accordance with IEEE 802.11s.

14. A system for providing communications at an incident site, the system comprising:
   first and second evolution-data optimized (EVDO) wireless routers, each of said first and second EVDO wireless routers comprising:
      a plurality of wireless network carrier cards, each of the network carrier cards adapted for use with one of a like plurality of different carrier networks;
      a carrier card determination processor to determine which of the plurality of network carrier cards provides a suitable connection to a carrier network;
      a carrier selection processor to select one or more suitable connections to one or more of the carrier networks in response to information from said carrier card determination processor;
      a carrier connection processor to connect the EVDO router to the carrier network through a particular one of the plurality of network carrier cards;
      a load balancing processor for load balancing between a plurality of different backbone networks and wherein the load balancing processor directs traffic among multiple networks to provide a desired throughput;
      a failover system for detecting a network failure and in response to detection of a network failure for causing the router to operate in a failover mode such that the routes all data, communications and other information only over an operating network; and
   a virtual private network coupled between said first and second EVDO wireless routers.

15. The router of claim 14 further comprising:
   a network controller with each of the plurality of wireless network carrier cards in communication with the network controller and each configured to become a client of a cellular network and to exchange network signals of a cellular network signal configuration between the cellular network and the network controller.

16. The router of claim 15 further comprising a network interface device in communication with the network controller configured as a local area network access point for hosting local area network configured client devices and for exchanging network signals of local area network signal configuration between the local area network client devices and the network controller.

17. The router of claim 14 further comprising a network interface device in communication with the network controller configured as a local area network access point for hosting local area network configured client devices and for exchanging network signals of local area network signal configuration between the local area network client devices and the network controller.

* * * * *